United States Patent
Hedevang

(10) Patent No.: US 12,172,517 B2
(45) Date of Patent: Dec. 24, 2024

(54) METHOD AND SYSTEM FOR DETERMINING THE CLOSURE STATUS OF A FUEL TANK CLOSURE

(71) Applicant: KAUTEX TEXTRON GmbH & Co. KG, Bonn (DE)

(72) Inventor: Poul Hedevang, Bonn (DE)

(73) Assignee: KAUTEX TEXTRON Gmbh & Co. KG, Bonn (DE)

(*) Notice: Subject to any disclaimer, the term of this patent is extended or adjusted under 35 U.S.C. 154(b) by 102 days.

(21) Appl. No.: 17/924,334

(22) PCT Filed: Apr. 22, 2021

(86) PCT No.: PCT/EP2021/060585
§ 371 (c)(1),
(2) Date: Nov. 9, 2022

(87) PCT Pub. No.: WO2021/228529
PCT Pub. Date: Nov. 18, 2021

(65) Prior Publication Data
US 2023/0173913 A1  Jun. 8, 2023

(30) Foreign Application Priority Data
May 11, 2020 (DE) .............. 10 2020 112 715.4

(51) Int. Cl.
*B60K 15/04* (2006.01)
*B60K 15/03* (2006.01)

(52) U.S. Cl.
CPC .. *B60K 15/0406* (2013.01); *B60K 2015/0319* (2013.01)

(58) Field of Classification Search
CPC .............. B60K 15/0406; B60K 2015/0319
USPC ................................................ 220/86.2
See application file for complete search history.

(56) References Cited

U.S. PATENT DOCUMENTS

| | | | |
|---|---|---|---|
| 5,675,073 A | 10/1997 | Otsuka | |
| 2009/0314072 A1 | 12/2009 | Slusser et al. | |
| 2014/0175096 A1* | 6/2014 | Iwaya | B60K 15/03519 220/86.2 |
| 2017/0146426 A1* | 5/2017 | Aso | G01M 3/2876 |
| 2019/0301380 A1* | 10/2019 | Fukui | F02D 41/0042 |

FOREIGN PATENT DOCUMENTS

| | | | |
|---|---|---|---|
| DE | 69616269 | 6/2002 | |
| DE | 102010021353 | 11/2011 | |
| DE | 102010048841 | 4/2012 | |
| EP | 1946954 | 7/2008 | |
| GB | 2291865 A * | 2/1996 | ......... F02M 25/0809 |
| JP | 3777863 B2 * | 5/2006 | |

OTHER PUBLICATIONS

PCT International Search Report for corresponding PCT Application No. PCT/EP2021/060585 dated Jul. 27, 2021, 12 pages.
PCT International Preliminary Report on Patentability for corresponding PCT Appilcation No. PCT/EP2021/060585 dated Nov. 24, 2022, 9 pages.

* cited by examiner

*Primary Examiner* — Mahmoud Gimie
(74) *Attorney, Agent, or Firm* — Lee & Hayes, P.C.

(57) ABSTRACT

A method for detecting the closure status of a fuel tank closure of a motor vehicle and to a device for carrying out this method.

14 Claims, 4 Drawing Sheets

METHOD AND SYSTEM FOR DETERMINING THE CLOSURE STATUS OF A FUEL TANK CLOSURE

Figure 1:
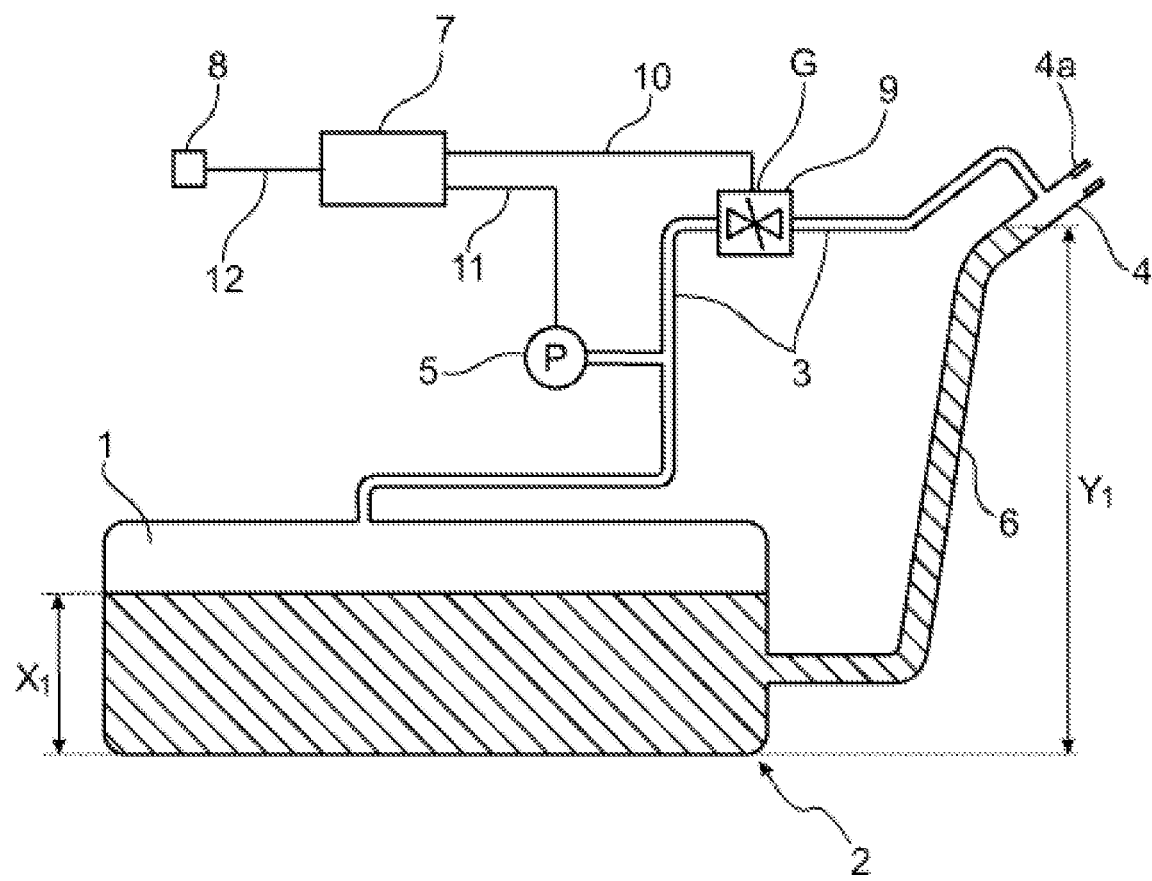

This Application claims priority to PCT Application No. PCT/EP2021/060585, filed Apr. 22, 2021, which claims priority to DE Patent Application No. 102020112715.4, filed May 11, 2020, the contents of each of which is incorporated herein by reference.

FIELD OF THE INVENTION

The invention is in the field of methods and systems for determining the closure status of a fuel tank closure of a motor vehicle.

BACKGROUND

After a completed refueling process, a tank cap must be fluid-tightly mounted on the filler neck, inter alia to prevent fuel vapors from escaping from the fuel tank. It would therefore be beneficial to provide a method or a device that shows a user of the motor vehicle in a reliable manner, if possible before driving off with the vehicle or shortly after a completed refueling process, whether the tank cap is fluid-tightly mounted on the filler neck.

The object of the invention is therefore to provide a method for determining whether the tank cap has been fluid-tightly mounted on the filler neck.

DESCRIPTION OF THE INVENTION

The invention is directed to a method carried out by a device for data processing for detecting the closure status of a fuel tank closure of a motor vehicle.

The method comprises the steps of:
  obtaining a value for a first pressure which is present in the gas chamber of the fuel tank of the motor vehicle;
  outputting a signal to open a recirculation line leading from the fuel tank into the filler neck of the fuel tank;
  obtaining a value for a second pressure which is present in the gas chamber of the fuel tank;
  if the second pressure is lower than the first pressure by a predetermined value, determining that the fuel tank closure is not closed and outputting a value for the closure status that indicates that the fuel tank closure on the filler neck is not closed.

The method can be carried out in the order of the steps described above.

The method is based on the knowledge that when the fuel tank is full, the fuel rises in the filler pipe. This means that the liquid level in the filler pipe can be higher than in the fuel tank. The liquid level in the filler pipe is therefore in the upper part of the filler pipe or in the filler neck thereabove. At this point in time, there is a gas atmosphere above this liquid level.

At this point in time, all (vent) lines for transporting gases connected to the fuel tank are fluid-tightly isolated from the atmosphere. At this point in time, there is a certain pressure in the gas chamber of the fuel tank which is higher than the atmospheric pressure. Normally the fuel tank closure should now be closed by mounting the tank cap onto the filler tube or another suitable closure device. However, if this is not the case, opening the recirculation line according to the method leads to a connection of the following three atmospheres: the gas atmosphere above the liquid level in the filler pipe, the gas chamber of the fuel tank, and the atmosphere. Other (vent) lines for transporting gases connected to the fuel tank, except the recirculation line, are not open at this point in time. By connecting the three atmospheres mentioned above, the pressure in the gas chamber of the fuel tank drops substantially to at most a pressure that corresponds to the pressure in the atmosphere. By being able to determine that the second pressure is lower than the first pressure by a predetermined value, it can be determined that the fuel tank closure is not closed. Conversely, if the fuel tank closure was fluid-tightly closed, it would be determined that only a small pressure drop has occurred, i.e. that the second pressure is not lower than the first pressure by a predetermined value.

The method offers the advantage that the closure status of a fuel tank closure can be determined via the pressure in the gas chamber. It is therefore not necessary to resort to any sensors or contact sensors or other mechanical devices on the tank closure itself. Such devices on the tank cover itself can wear out due to the constant mechanical stress of opening and closing the tank closure or lead to incorrect determinations/notifications due to dirt introduced between the tank cap and the filler neck.

A recirculation line is understood to mean any line or vent line, e.g. filling vent line, which leads from the fuel tank into the filler neck of the fuel tank.

The gas chamber of the fuel tank is understood to mean the region of a fuel tank which, in the installed position, is not filled with fuel to a predetermined maximum level even after the fuel tank has been filled, so that this gas chamber only contains fluids in gaseous form (at the usual operating temperatures for a fuel tank or for a motor vehicle).

The time between determining the first and second pressure can be less than 10 seconds, 8 seconds, 6 seconds, 4 seconds, 3 seconds, 2 seconds or 1 second.

The time interval between determining the first and second pressure can be predetermined; for example, it can be 10 seconds, 8 seconds, 6 seconds, 4 seconds, 3 seconds, 2 seconds or 1 second. Alternatively or additionally, the value relevant for determining the second pressure can be determined by the data processing device as the value at which the value of the second pressure no longer changes after 1, 2, 3, 4 or 5 seconds.

The pressure can be determined via a pressure sensor. The pressure sensor can transmit the value of the detected (measured) pressure to a processing unit, for example the device for data processing, via a signal line. The value data can be transmitted in analog or digital form via the signal line. In principle, all signals between the components of the system described here can be transmitted digitally or analogously. All the usual signal lines are suitable for this, such as cables, cable systems, bus systems, signal lines with electrical or optical transmission or wireless signal paths (such as Bluetooth, WiFi, RFID, mobile radio or infrared transmission). The pressure sensor must have (fluid) access to the gas chamber, but the position of the pressure sensor or the access of the pressure sensor in the fuel tank system to the gas chamber is not restricted as long as there is access to the gas chamber. For example, the access of the pressure sensor in the recirculation line can be at a position that allows access to the gas chamber even after the recirculation line has been closed. The position of the access can also be in the lid or the side walls of the tank.

In the case of digitally transmitted values, the sensor is provided with a digital-to-analog converter or coupled to a digital-to-analog converter to generate the digital signal.

The pressure to be measured can be an absolute pressure, i.e. a pressure that is not given in reference to the pressure in another fluid. The pressure sensor can therefore measure the absolute pressure in the gas chamber. Alternatively, the pressure can be a differential pressure. The differential pressure can be measured with a differential pressure sensor. The differential pressure sensor could have access to the gas chamber and access to the atmosphere in order to determine the pressure difference from the atmosphere in this way. Alternatively, the differential pressure can also be measured by two pressure sensors, each of which determines the absolute pressure in the gas chamber or the absolute pressure in the atmosphere, with the difference in the pressures being determined in a device for data processing or another device for outputting a differential pressure on the basis of the measured values of the two pressure sensors.

The signal to open a recirculation line can be transmitted through a signal line. The recirculation line can be opened and closed by any known device for closing and opening a line for transporting gaseous fluids, i.e. a shut-off element. These include valves, gate valves or butterfly valves. The shut-off elements can be controlled by the device for data processing via signal lines. The shut-off elements are shut-off elements that are operated in an (electrically) motorized or (electro)magnetic manner or shut-off elements having a shape memory alloy actuator. If optical signal lines are used, the shut-off elements are equipped with an electrical supply. The shut-off element in the recirculation line can be referred to as a recirculation shut-off element or valve.

The method can comprise the following step prior to the above-mentioned steps: transmitting a signal to interrupt the connection of the gas chamber to the atmosphere. From the gas chamber of the fuel tank there may be several lines that are in direct or indirect contact with the atmosphere, e.g. the recirculation line or lines that are part of filter systems and/or (further) ventilation systems such as activated carbon filter systems, such as those known from an ORVR (onboard refueling vapor recovery) system or an EVR (external vapor recovery) system. By disconnecting the gas chamber from the atmosphere, the first pressure in the gas chamber may be greater than that in the atmosphere. This can (if filling continues) cause the liquid level in the filler tube to rise above the liquid level in the fuel tank. Furthermore, the rise in the liquid level in the filler pipe can lead to filling being interrupted due to the closing of the nozzle of the dispenser. However, further filling can still be possible by manually initiating the opening of the nozzle.

Alternatively, it is possible for the connection of the gas chamber to the atmosphere to be interrupted by the mechanical/construction-related design of the (refueling vent) valves in the (refueling vent) lines. For example, at a predetermined liquid level in the fuel tank, the (refueling vent) valve or valves may close without a signal being required by a device for data processing for this purpose.

Transmitting a signal to interrupt the connection of the gas chamber to the atmosphere can comprise transmitting a signal to interrupt the recirculation line.

The method can be carried out after determining
i) that the fuel tank has been filled,
ii) that a tank flap on the fuel tank closure has been closed,
iii) that a motor has been switched on to propel the vehicle, or
iv) that the filling process has been defined as completed by the device for data processing,
or two, three or four of the conditions i) to iv) are present.

Carrying out the method after it has been determined that the fuel tank has been filled has the advantage that the method has been used at exactly the point in time at which there is an increased likelihood that the closure has not been closed properly. In order to determine whether the fuel tank has been filled, it can be determined that the liquid level in the fuel tank has risen compared to an earlier point in time and has not risen further within a defined time window. Floating devices, capacitance measuring devices or proximity sensors (e.g. ultrasonic sensors) can be used as sensors for measuring the liquid level in the fuel tank. The sensors for measuring the liquid level can transmit data regarding the liquid level to a device for data processing via signal lines, in which data regarding previous liquid levels can also be stored. By comparing the current fluid level data to the previous fluid level data, a determination can be made as to whether the fuel tank has been filled.

The method can further comprise determining that the fuel tank has been filled, where it is determined that the fuel tank has been filled to its full capacity. Full capacity can be determined by the fact that the tank has been filled to a predefined liquid level.

The method can further comprise determining that the fuel tank has been filled, with the liquid level of fuel in the tank filler tube being above the liquid level in the fuel tank. This indicates that the pressure in the fuel tank gas chamber is above the atmospheric pressure. The fuel filler pipe extends from the fuel tank to the filler neck.

Carrying out the method after it has been determined that the tank flap on the fuel tank closure has been closed has the advantage that the method is started at exactly the point in time at which there is an increased likelihood that the closure has not been closed properly.

The tank flap is used to cover the tank cap and has, for example, the function of optically covering the tank cap and creating a uniform image with the body surface when closed. Furthermore, the tank flap can have the function of locking access to the fuel tank closure.

In order to determine whether the tank flap at the fuel tank closure has been closed, it may be determined that a contact sensor device (magnetic, electrical, visual, or audible) on the tank flap indicates whether the tank flap has been opened and reclosed. Via signal lines, the contact sensor device can forward data regarding the opening and closing of the tank flap to a device for data processing, in which data regarding earlier opening and closing of the tank flap can also be stored.

Carrying out the method after it has been determined that an engine has been switched on to propel the vehicle has the advantage that the method would be used exactly at the point in time at which there is a risk that the vehicle will be set in motion, for example after refueling, without the fuel closure having been closed. Furthermore, the user still has the opportunity at this point in time to close the fuel closure correctly, i.e. before setting the vehicle in motion. The motor for propelling the vehicle can be an internal combustion engine or an electric motor, for example the electric motor of a hybrid vehicle. It does not matter whether the fuel filled in is also used to power the engine to propel the vehicle, only that it has been determined that the vehicle is likely to be put into motion soon. If a plurality of conditions i) to iv) are checked, step iii) should be checked last. The method should be initiated at this point in time at the latest.

Carrying out the method after it has been determined that the filling process has been defined as completed by the device for data processing has the advantage that the method is carried out immediately after the point in time at which the refueling was ended. The device for data processing can define the filling process as completed if, as a result of data transmission, a sensor on the vehicle indicates that the filling process is complete. Alternatively, the data processing device can define the filling process as completed if, as a result of direct or indirect data transmission by a filling device (such as a fuel pump) to the device for data processing, it is indicated that the filling process is complete.

The method can be carried out after conditions i), ii), iii), iv) are present, optionally in the temporal order i), ii) (and/iv)), iii).

The method can be carried out after conditions i), ii) are present, optionally in the temporal order of conditions i), ii).

The method can be carried out after conditions i), iii) are present, optionally in the temporal order i), iii).

The method can be carried out after conditions i), iv) are present, optionally in the temporal order i), iv).

The value of the first pressure can be at least 100 pascals (1 mbar), at least 200 pascals (2 mbar), at least 300 pascals (5 mbar), at least 500 pascals (5 mbar), at least 1000 pascals (10 mbar) or at least 2000 pascals (20 mbar) higher than the pressure in the atmosphere. The pressure in the atmosphere is to be understood as the pressure that prevails in the atmosphere surrounding the vehicle (e.g. 1013.25 hPa as standard pressure, fluctuating depending on the weather and altitude). With this value of the first pressure, a difference from the value of the second pressure can be determined particularly easily.

The second pressure may be at least 10%, 15%, 20%, 30%, 40%, 50%, 60%, 70%, 80%, 90%, or 100% lower than the first pressure (i.e. the predetermined value is a value that is 10%, 15%, 20%, 30%, 40%, 50%, 60%, 70%, 80%, 90%, or 100% of the value of the first pressure). With these pressure differences, it is particularly easy to determine whether the fuel tank closure does not close the filler neck.

The value of the first pressure and the value of the second pressure can each represent the value of a differential pressure compared to the atmosphere. The value of the atmospheric pressure can be obtained by measuring the atmospheric pressure, calibrating the pressure sensor, or setting it in the device for data processing.

The value of the first pressure and the second pressure can indicate an absolute value in pascals and the second pressure can be at least 85 pascals, 100 pascals, 150 pascals, 200 pascals, 250 pascals, 300 pascals, 350 pascals, 400 pascals, 450 pascals, 500 pascals, 550 pascals, 600 pascals, 650 pascals, 750 pascals, 800 pascals, 850 pascals, 900 pascals, or 1000 pascals lower than the first pressure. This means that the predetermined value, which indicates that the fuel tank closure is not closed when comparing the first pressure and the second pressure, can be 85 pascals, 100 pascals, 150 pascals, 200 pascals, 250 pascals, 300 pascals, 350 pascals, 400 pascals, 450 pascals, 500 pascals, 550 pascals, 600 pascals, 650 pascals, 750 pascals, 800 pascals, 850 pascals, 900 pascals, or 1000 pascals. With these pressure differences, too, it is particularly easy to determine whether the fuel tank closure does not close the filler neck.

With continuous measurement of the pressure in the fuel tank, the device for data processing can also be used to determine the rate at which a pressure change occurs after the recirculation line has been opened, i.e. the speed of the pressure change. Continuous measurement means that the device for data processing receives data from the pressure sensor(s) regarding the pressure prevailing in the gas chamber of the fuel tank at least every 1000 ms, 500 ms, 300 ms, 100 ms, 50 ms, 30 ms or 10 ms. The closure status can be determined from this speed when a predetermined threshold value is exceeded.

Outputting a value for the closure status that indicates that the fuel tank closure does not close the filler neck can cause the output of a signal (output signal) which can be perceived by the user. The device for data processing can route the output value to a signal transmitter in the passenger compartment via a signal line. The signal transmitter can output a visual, acoustic or haptic output signal in the passenger compartment, which signal can function as a warning signal. The visual output signal may be an activated warning light. The warning light may be part of an instrument panel, which comprises a display or instrument panel, and may include digital or analog warning lights, or may be part of a display of a head-up display.

Furthermore, the invention is directed to a method for detecting the closure status of a fuel tank closure of a motor vehicle, comprising the above-mentioned method and comprising the steps of:
  determining the first pressure present in the gas chamber of the fuel tank of the motor vehicle;
  opening the recirculation line leading from the fuel tank into the fuel tank filler neck;
  determining the second pressure present in the gas chamber of the fuel tank;
  if the second pressure is lower than the first pressure by a predetermined amount, determining that the fuel tank closure is not closed.

Furthermore, the invention relates to a computer program comprising instructions which, when the program is executed by a computer, cause said computer to carry out the above-mentioned method.

Furthermore, the invention relates to a computer-readable storage medium comprising instructions which, when executed by a computer, cause said computer to carry out the above-mentioned method.

Furthermore, the invention relates to a device for data processing, comprising means for carrying out the above-mentioned method.

Furthermore, the invention relates to a system for detecting the closure status of a fuel tank closure of a motor vehicle, comprising
  a fuel tank with a tank filler pipe and a filler neck;
  a recirculation line leading from the fuel tank into the filler neck of the fuel tank;
  a sensor for detecting the pressure in the gas chamber of the fuel tank;
  a closure device on the filler neck for separating the fuel tank from the atmosphere; and
  a device for data processing as defined above.

The system can comprise a device for determining the fill level in the fuel tank. The system can comprise a device for ending the filling process for a fuel tank. In particular, the system can comprise a refueling vent valve device for a fuel tank. The refueling vent valve device can comprise a mechanical or electromechanical refueling vent valve placed in a line that removes gases from the gas chamber of the fuel tank and is open during the fueling process.

The device for determining the fill level can send a signal to the device for data processing which indicates that a predetermined or maximum fill level in the tank has been reached. The device for data processing can then transmit a signal to the refueling vent valve device to close the refueling vent valve device.

Alternatively, the design of the refueling vent valve (e.g. floatable valve body, the floating of which leads to the closure of the valve seat) can cause the refueling vent valve device to close. The refueling vent valve device can be provided in the recirculation line and can correspond to the recirculation line valve or can be accommodated in another line for ventilating the fuel tank.

The fuel tank can be made of any suitable material, such as plastics material (e.g. HDPE) or metal. The fuel tank made of plastics material can be manufactured by blow molding or injection molding.

The fuel tank can comprise all the usual devices or apparatuses such as fuel pump(s), rollover valves, fuel lines or their connections, sensors that are not pressure sensors (e.g. temperature sensors, ultrasonic sensors), floats, baffles, and internal and external support devices for stabilizing the fuel tank.

In particular, the fuel tank can be designed as a system for reducing hydrocarbon emissions during refueling, such as an ORVR (onboard refueling vapor recovery) system or an EVR (external vapor recovery) system. The fuel tank can therefore have a refueling vent valve which can establish a fluid connection from the gas chamber of the fuel tank to an activated carbon filter via a line. The activated carbon filter can be connected via a further line to a vent valve, which in turn is connected to a discharge line. The activated carbon filter can be connected to a leak detection unit via a further line, such as in an ORVR system.

The wall of the fuel tank can have one or more layers and contain one or more barrier layers made of material that is impermeable to the hydrocarbons contained in the fuel, e.g. EVOH.

The device for data processing can be any conventional device for data processing, for example a processor with a working memory and a storage medium which are connected via a data bus.

DRAWINGS

FIG. 1 schematically illustrates the structure of a fuel tank system. The level in the fuel tank and the tank filler pipe in FIG. 1 illustrates the situation at a point in time at which the (recirculation line) valve is closed.

Figure 2:
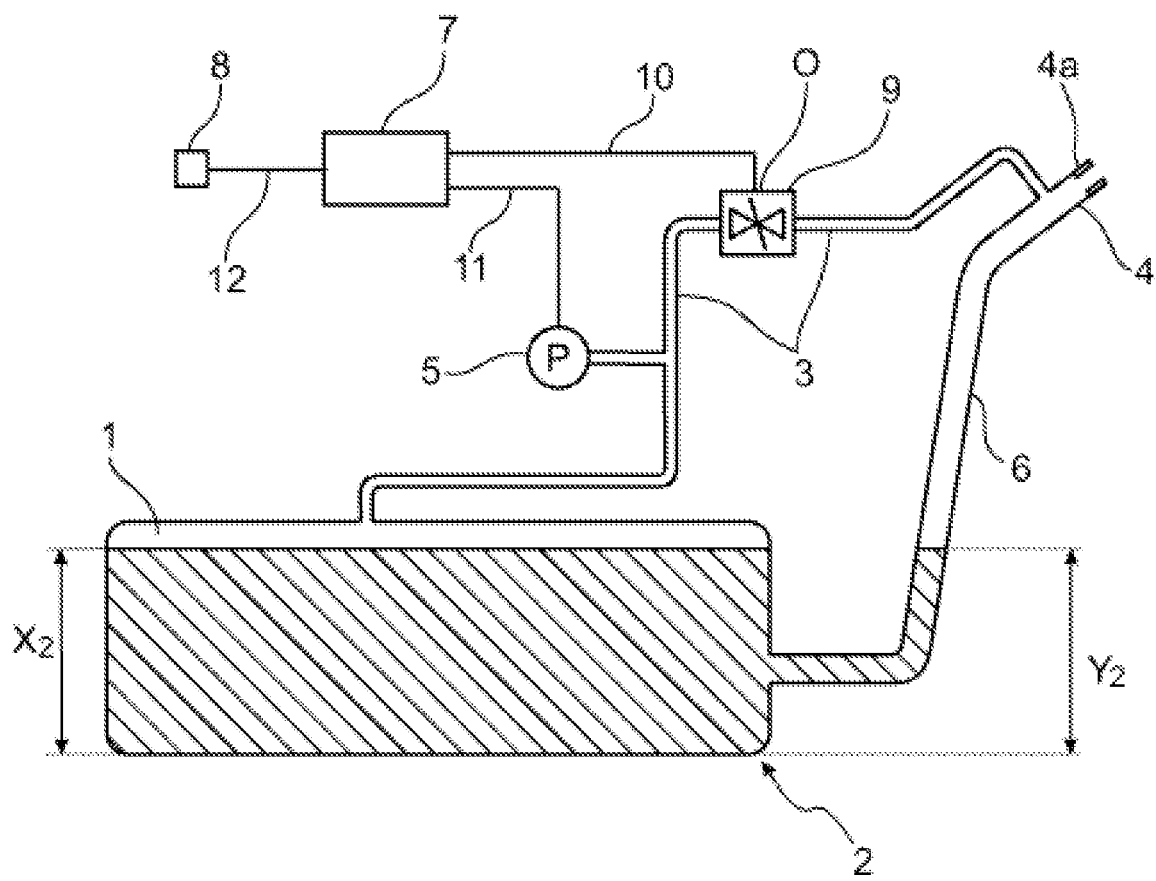

FIG. 2 schematically illustrates the state of the fuel tank system of FIG. 1 at a point in time at which the valve is open and the tank cap has not been fluid-tightly mounted on the filler neck.

Figure 3:
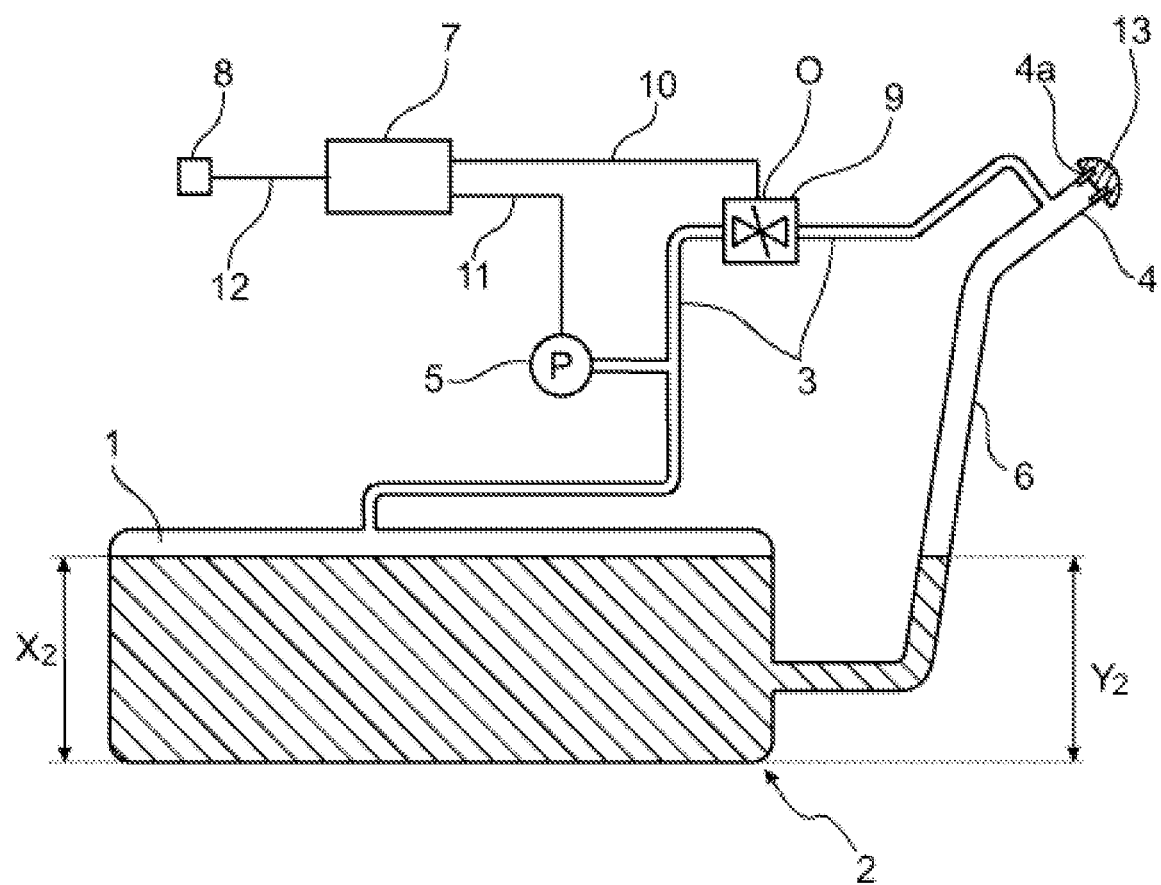

FIG. 3 schematically illustrates the state of the fuel tank system of FIG. 1 at a point in time at which the valve is open and the tank cap has been mounted on the filler neck.

Figure 4:
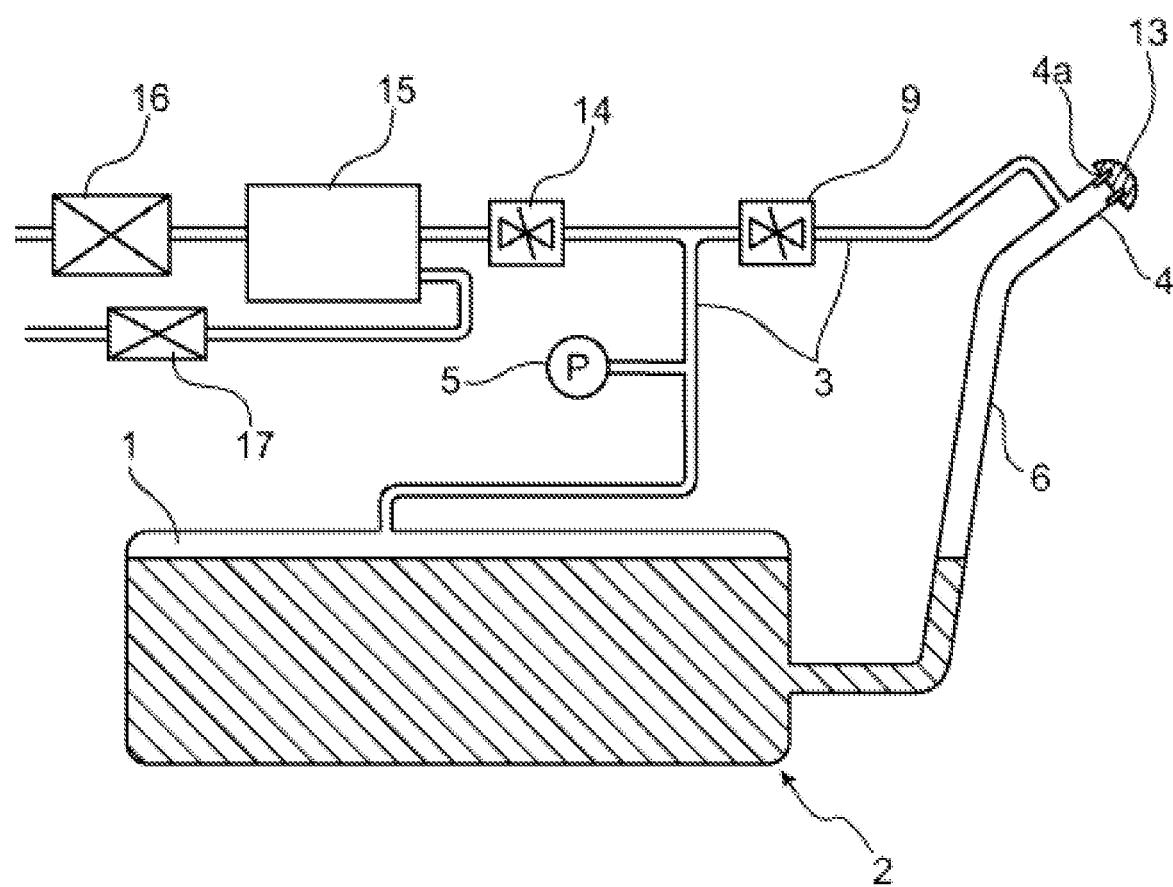

FIG. 4 illustrates the fuel tank system as an ORVR (onboard refueling vapor recovery) system.

EXAMPLE

FIG. 1 shows a fuel tank system with a fuel tank 2 and a tank filler pipe 6 provided thereon, to which a filler neck 4 is attached. Furthermore, a pressure sensor 5 is provided on a recirculation line 3 which establishes a fluid connection between the gas chamber 1 and a volume in the filler neck 4. However, the pressure sensor can be installed at any point in the fuel system, provided it has access to the gas chamber 1. A controllable recirculation line valve 9 is provided in the recirculation line, through which valve the connection between the gas chamber 1 and the volume in the filler neck 4 can be interrupted.

Furthermore, the fuel tank system contains a device 7 for data processing. This device 7 can be connected to sensors, controllable valves, output systems such as signal transmitters, or other actuators via signal lines (also called data lines or data exchange lines). The fuel tank system can have a data line between the recirculation line valve 9 and the device 7, a data line 11 between the pressure sensor and the device 7, and a data line 12 between the device 7 and the signal transmitter.

FIG. 1 shows the fuel tank system at a point in time at which the gas chamber 1 has no (gas) connection to the atmosphere. The recirculation line valve 9 is closed G, so that the connection between the gas chamber 1 and the filler neck 4 is interrupted.

At this point in time, the method according to the invention begins, which can be triggered, for example, by the device 7 determining that the fuel tank 2 has been filled or completely filled, an open tank flap (not shown) has been closed, or the engine for propelling (not shown) has been activated (or started).

In the gas chamber 1 there is a first pressure which is greater than the pressure of the atmosphere. The height Y1 of the liquid level in the tank filler pipe 6 is higher than the height X1 of the liquid level in the fuel tank 2. The gas chamber 1 is above the liquid level in the fuel tank. At this point in time, the fuel tank closure is not closed, i.e. the tank cap is not mounted on the filler neck.

At the point in time shown in FIG. 1, the device 7 for data processing receives values from the pressure sensor 5 relating to the level of pressure in the gas chamber 1, i.e. the values relating to the first pressure.

FIGS. 2 and 3, described below, illustrate the further course of the method in the event that the fluid-tight mounting of the tank cap 13 has taken place (FIG. 3) or not (FIG. 2).

FIG. 2 shows the fuel system in a state in which the fluid-tight mounting of the tank cap 13 has not taken place.

In particular, FIG. 2 shows the fuel system after the recirculation line valve 9 has been opened O as a result of a signal from the device 7 via the data line 11. The gas chamber 1 has a gaseous connection to the filler neck 4 via the open recirculation line 3, and this has access to the atmosphere. This leads to a reduction in the pressure in the gas chamber 1 within a short period of time. The liquids in the fuel tank 2 and the liquids in the tank filler pipe are also now subjected to the same or at least approximately the same pressure. As a result, the height Y2 of the liquid level in the tank filler pipe 6 and the height X2 of the liquid level in the fuel tank 2 equalize until they have reached the same or almost the same level.

At the point in time shown in FIG. 2, the device 7 for data processing receives values from the pressure sensor 5 relating to the level of pressure in the gas chamber 1, i.e. the values relating to the second pressure. While FIG. 2 shows the situation in which the height Y2 of the liquid level in the tank filler pipe 6 and the height X2 of the liquid level in the fuel tank 2 have largely equalized, it is also possible to determine the value of the second pressure at a point in time at which the liquid levels have just begun to equalize. The equalizing of the liquid level occurs as a result of the pressure drop in the gas chamber 1. The pressure drop in the gas chamber 1 sets in quickly, while the liquid level is equalized with a delay compared to the pressure drop.

The device 7 can determine a difference from these two determined values for the first and second pressure. If this difference exceeds a predetermined threshold, the device 7 determines that the fuel tank closure does not close the filler neck. The device 7 can then transmit a signal to the signal transmitter 8 via the data line 12. In response to this, the signal transmitter 8 outputs an output signal, e.g. an optical signal such as an activated indicator light (e.g. with a stylized symbol), which informs the user that the fuel tank closure does not fluid-tightly close the filler neck, or that the tank cap does not fluid-tightly close the filler neck.

FIG. 3 shows the fuel system in a state in which the fluid-tight mounting of the tank cap 13 has taken place, in contrast to the situation shown in FIG. 2.

In particular, FIG. 3 shows the fuel system after the recirculation line valve 9 has been opened O as a result of a signal from the device 7 via the data line 11. The gas chamber 1 has a gaseous connection to the filler neck 4 via the open recirculation line 3, but this has no access to the atmosphere because of the mounted tank cap 13. This leads to a significantly smaller reduction in the pressure in the gas chamber 1 within a predetermined period of time than would be the case in the situation described in FIG. 2. This is due to the fact that the gas volume in the filler neck is only relatively small, whereas in the situation described in FIG. 2 the gas chamber is at least indirectly in connection with the atmosphere. The liquids in the fuel tank 2 and the liquids in the tank filler pipe are now subjected to the same or at least approximately the same pressure. As a result, the height Y1 of the liquid level in the tank filler pipe 6 and the height X1 of the liquid level in the fuel tank 2 equalize until they have reached the same or almost the same level.

At the point in time shown in FIG. 3, the device 7 for data processing receives values from the pressure sensor 5 relating to the level of pressure in the gas chamber 1, the values relating to the second pressure.

The device 7 can determine a difference from these two determined values for the first and second pressure. The device 7 is configured in such a way that it determines that this difference falls below a predetermined threshold value. The device 7 then determines that the fuel tank closure closes the filler neck and can optionally output a value for the closure status that indicates that the fuel tank closures closes the filler neck. There is no need to inform the user of this result, or in a first alternative it can be possible to store this information, or in a second alternative the device 7 can transmit a signal to the signal transmitter 8 via the data line 12. In response to this, the signal transmitter 8 outputs an output signal, e.g. an optical signal such as an activated indicator light (e.g. with a stylized symbol), which informs the user that the fuel tank closure fluid-tightly closes the filler neck, or that the tank cap fluid-tightly closes the filler neck.

FIG. 4 illustrates the fuel tank system in the form of an ORVR system.

The fuel tank 2 has a refueling vent valve 14 which establishes a fluid connection from the gas chamber 1 of the fuel tank 2 to an activated carbon filter 15 via a line. The activated carbon filter 15 is connected via a further line to a vent valve 17 (purge valve), which in turn is connected to a discharge line. The activated carbon filter 15 is connected to a leak detection unit 16 via a further line. An alternative, not shown here, with an EVR (external vapor recovery) system does not have a leak detection unit 16. In the present case, the recirculation valve 9 and refueling vent valve 14 share their feed line 3 except for a portion short of the respective valves 9 and 14, which is forked. However, it is also possible for the valves 9 and 14 to have separate feed lines.

REFERENCE SIGNS

1: Gas chamber
2: Fuel tank
3: Recirculation line
4: Filler neck
4a: Part of the fuel tank closure device in the filler neck that is permanently mounted in the filler neck
5: Pressure sensor
6: Tank filler pipe
7: Device for data processing
8: Signal transmitter
9: (Recirculation line) valve
10: Data line between valve and device for data processing
11: Data line between pressure sensor and device for data processing
12: Data line between device for data processing and signal transmitter
13: Tank cap (tank cover); part of the fuel tank closure assembly that is reversibly mounted in the filler neck.
14: Refueling vent valve
15: Activated carbon filter
16: Leak detection unit
17: Vent valve
G: Valve closed
O: Valve open

The invention claimed is:

1. A method for detecting a closure status of a fuel tank closure of a motor vehicle, the method comprising steps of:
    obtaining a value for a first pressure which is present in a gas chamber of the fuel tank of the motor vehicle;
    outputting a signal to open a recirculation line leading from the fuel tank into a filler neck of the fuel tank;
    obtaining a value for a second pressure which is present in the gas chamber of the fuel tank; and
    when the value of the second pressure is lower than the value of the first pressure by a predetermined value, determining that the fuel tank closure is not closed and outputting a value for the closure status that indicates that the fuel tank closure does not close the filler neck.

2. The method according to claim 1, wherein prior to the step of obtaining the value for the first pressure, transmitting a signal to interrupt a connection of the gas chamber to an atmosphere.

3. The method according to claim 2, wherein the step of transmitting the signal comprises transmitting the signal to interrupt a recirculation line.

4. The method according to claim 1, wherein prior to the step of obtaining the value for the first pressure, determining one or more of:
    i) that the fuel tank has been filled,
    ii) that a motor has been switched on to propel the motor vehicle,
    iii) a tank flap on the fuel tank closure has been closed, or
    iv) that a filling process has been defined as completed.

5. The method according to claim 4, wherein the determining that the fuel tank has been filled comprises determining that a level in the fuel tank has increased and determining that the level in the fuel tank is no longer increasing.

6. The method according to claim 5, wherein the determining that the fuel tank has been filled further comprises determining that the fuel tank has been filled to full capacity.

7. The method according to claim 4, wherein the determining that the fuel tank has been filled further comprises determining that a liquid level of fuel in a tank filler pipe of the fuel tank is above a liquid level of the fuel in the fuel tank.

8. The method according to claim 1, wherein the value of the first pressure is at least 250 pascals greater than a pressure in an atmosphere at the motor vehicle.

9. The method according to claim 1, wherein the value of the second pressure is at least 10% lower than the value of the first pressure.

10. The method according to claim 1, wherein the outputting the value for the closure status that indicates that the fuel tank closure does not close the filler neck causes an output of a visual, acoustic, or haptic signal in a passenger compartment of the motor vehicle.

11. The method according to claim 10, wherein the visual, acoustic, or haptic signal is a visual warning signal in or on a dashboard of the motor vehicle.

12. A method for detecting a closure status of a fuel tank closure of a motor vehicle, the method comprising steps of:
    determining a first pressure present in a gas chamber of a fuel tank of the motor vehicle;
    opening a recirculation line of the motor vehicle;
    determining a second pressure present in the gas chamber of the fuel tank; and
    when the second pressure is lower than the first pressure by a predetermined value, determining that the fuel tank closure is not closed.

13. A system comprising:
    one or more processors having memory containing instructions, which when executed cause the one or more processors to perform operations, including:
        obtaining a value for a first pressure which is present in a gas chamber of the fuel tank of the motor vehicle;
        outputting a signal to open a recirculation line leading from the fuel tank into a filler neck of the fuel tank;
        obtaining a value for a second pressure which is present in the gas chamber of the fuel tank; and
        when the value of the second pressure is lower than the value of the first pressure by a predetermined value, determining that the fuel tank closure is not closed and outputting a value for the closure status that indicates that the fuel tank closure does not close the filler neck.

14. A system for detecting a closure status of a fuel tank closure of a motor vehicle, the system comprising
    a fuel tank with a tank filler pipe and a filler neck;
    a recirculation line leading from the fuel tank into the filler neck of the fuel tank;
    a sensor for detecting a pressure in a gas chamber of the fuel tank;
    a closure device on the filler neck for separating the fuel tank from an atmosphere; and
    a device for data processing including:
        one or more processors having memory containing instructions, which when executed cause the one or more processors to perform operations, including:
            obtaining a value for a first pressure which is present in a gas chamber of the fuel tank of the motor vehicle;
            outputting a signal to open a recirculation line leading from the fuel tank into a filler neck of the fuel tank;
            obtaining a value for a second pressure which is present in the gas chamber of the fuel tank; and
            when the value of the second pressure is lower than the value of the first pressure by a predetermined value, determining that the fuel tank closure is not closed and outputting a value for the closure status that indicates that the fuel tank closure does not close the filler neck.

* * * * *